United States Patent [19]
Mandell et al.

[11] Patent Number: 5,395,163
[45] Date of Patent: Mar. 7, 1995

[54] UTILITY CART AND LATCH ASSEMBLY THEREFOR

[75] Inventors: Jonathan N. Mandell; Glen E. Tomblin, both of Winchester, Va.

[73] Assignee: Rubbermaid Commercial Products Inc., Winchester, Va.

[21] Appl. No.: 17,044

[22] Filed: Feb. 12, 1993

[51] Int. Cl.$^6$ .............................................. B60P 1/24
[52] U.S. Cl. .................................... 298/38; 298/2; 298/5
[58] Field of Search ................. 298/1 R, 1 A, 1 T, 2, 298/5, 6, 38; 280/47.31, 402, 47.26; 292/107, 108, 209, 210

[56] References Cited

U.S. PATENT DOCUMENTS

| | | | |
|---|---|---|---|
| 1,139,307 | 5/1915 | Mecking | 298/38 |
| 2,393,647 | 1/1946 | Marple | 292/304 |
| 2,476,268 | 7/1949 | Beck et al. | 292/210 |
| 2,732,238 | 1/1956 | Dornberg | 292/108 |
| 3,092,272 | 6/1963 | Weigel | 298/38 |
| 3,160,439 | 12/1964 | Kozakowitz | 298/38 |
| 3,936,070 | 2/1976 | Owings | 298/5 |
| 4,168,932 | 9/1979 | Clark | 298/38 |
| 4,417,765 | 11/1983 | Wirsbinski | 298/5 |
| 4,635,956 | 1/1987 | Morrissette | 280/47.26 |
| 4,645,225 | 2/1987 | Eubanks | 280/47.31 |
| 4,705,308 | 11/1987 | Bisbing | 292/108 |
| 4,802,709 | 2/1989 | Jones | 298/6 |
| 4,824,137 | 4/1989 | Bolden | 280/47.26 |
| 5,249,842 | 10/1993 | Doering et al. | 298/6 |

FOREIGN PATENT DOCUMENTS 6611  2/1898  Norway ................................ 298/6

OTHER PUBLICATIONS 2 page advertisement, "Estate Masters"; AECO Estate Products Limited, 1552 Hertel Ave., Suite 905, Buffalo, N.Y. 14216-2882; at least as early as Jan. 1992.

1 page advertisement "Converta-Cart"; Converta-Cart, a Division of Enterprising Associated Council Inc, 1668 Kings Down Circle, Atlanta Ga. 30338; at least as early as Jan. 1992.

1 page advertisement; Brinly Carts; at least as early as Jan. 1992.

1 page advertisement, "Versa-Cart TM System"; at least as early as Jan. 1992.

2 page advertisement, "Lambert Ready-To-Assembly T-10RTA, HT-10RTA", Lambert Corporation, 117 S. Third, Box 278, Ansonia, Ohio 45303; at least as early as Jan. 1992.

2 page advertisement, "Aeco's Polywagon", Aeco Estate Products Limited, 1552 Hertel Avenue, Buffalo, New York 14216-2882; at least as early as Jan. 1992.

4 page brochure, "The Heavyweights", Agri-Fab, 303 West Raymond St., Sullivan, Illinois 61951; Jul. 1991.

*Primary Examiner*—Michael S. Huppert
*Assistant Examiner*—Gregory A. Morse
*Attorney, Agent, or Firm*—Renner, Kenner, Greive, Bobak, Taylor & Weber

[57] ABSTRACT

A utility cart (10) for hauling up to at least 1000 pounds includes a plastic carriage (11) having reinforcement ribs (47) extending from and across the bottom thereof to strengthen the carriage (11), an elongated drawbar member (12) to pull the carriage (11), an axle assembly (15) engaging the carriage (11) and one end of the drawbar member (12) to pivot the carriage (11) with respect to the drawbar member (12), a latch assembly (16) connected to the drawbar member (12) and engaging the carriage (11) to restrain the pivotal movement of the carriage (11) with respect to the drawbar member (12), and at least two wheels (13, 14) attached to the axle assembly (15). The latch assembly (16) includes a body member (53) pivotally connected to the drawbar member (12) and has a gripping portion (56) extending between a first leg portion (57) and a second leg portion (58). A rod (54) attached to the carriage (11) is received by slots (67) in the leg portions (57, 58) to releasably engage the carriage (11) to the drawbar member (12).

16 Claims, 4 Drawing Sheets

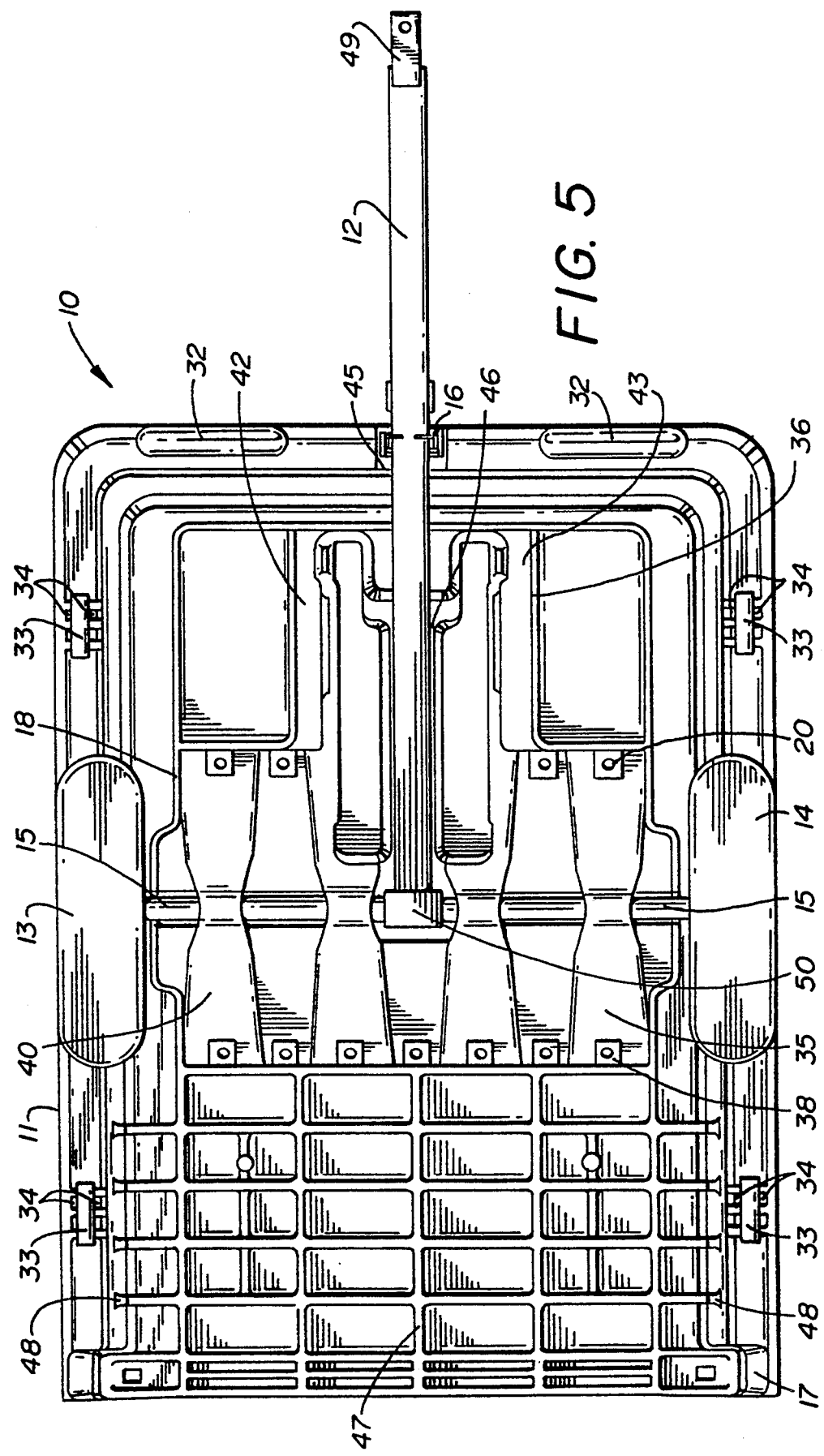

5,395,163

UTILITY CART AND LATCH ASSEMBLY THEREFOR

TECHNICAL FIELD

This invention relates to utility carts. More particularly, this invention relates to a two-wheeled utility cart of the type which may be pulled by a drawbar attached to a tractor or the like. Specifically, the present invention relates to a utility cart having a specially designed plastic undercarriage and plastic tub for holding up to at least 1000 pounds. A unique latch mechanism with a safety bail secures the tub and undercarriage to the drawbar and remains flush with or recessed within the undercarriage when the tub is in the closed or locked position.

BACKGROUND ART

Utility carts have long been used to haul equipment and other articles from one place to another. Generally, such carts include a tub in which the articles to be carried are placed, a drawbar or handle for pulling the cart, a latch mechanism for securing the tub to the drawbar or handle, and at least two wheels attached to an axle positioned below the tub. Commonly, these carts are moved by pulling them with a vehicle, such as a tractor, or by less powerful methods such as man power.

Most utility carts have been made of wood, metal or plastic. Wood carts are generally less sturdy than metal or plastic carts, and are more susceptible to cracking, chipping, or otherwise being damaged during use. Moreover, the roughness of the wood may cause splinters and other injuries not found with carts of other materials.

While metal carts have long been used for their strength and heavy duty load capacity, they also have disadvantages. For instance, these carts are susceptible to corrosion, may be dented easily, and usually are more expensive than other carts.

Plastic carts have recently gained acceptance in replacing these metal and wood carts. They are easily cleaned, do not corrode or rot like metal or wood, respectively, and are lighter and less expensive than other carts. However, one disadvantage of these type of carts has been that they cannot carry a great deal of weight. It is desirable for heavy duty utility carts to be able to carry up to at least 1000 pounds. When this much weight is added to plastic utility carts of the prior art, they are susceptible to breaking down and may crack under the strain, or the latch may disengage as discussed hereinbelow.

One practical aspect of these carts is that the tub may be pivoted around the axle of the cart so as to provide a dumping capability. This is commonly done by manipulating a latch such that the tub may be disengaged from the drawbar and rotated vertically to dump its contents out the rear of the cart.

In the past, the latch mechanisms employed to secure the tub to the drawbar have been, to say the least, somewhat difficult to operate. For example, one particular latch mechanism is operated by lifting a lever received within a housing. When the lever is lifted, a catch operatively attached thereto, releases a downward extending arm projecting from the tub which is being unlatched. Inasmuch as these prior latches generally protrude upwardly and outwardly from the drawbar and tub, the risk of injury to those who use the cart, as well as children who are around the cart, is significant. A latch which is at least flush with the tub of the cart or recessed within the tub of the cart would be highly desirable. The prior art latches also have a tendency to open if too much weight is placed toward the rear of the tub. In such situations, the tub will become disengaged from the drawbar spilling the contents thereof. Such an occurrence could also cause serious injury.

Therefore, the need exists for a cart which can hold up to at least 1000 pounds and which includes a latch which will not disengage from the tub of the cart upon placing a significant amount of weight in the tub, but rather will be more forcefully secured to the tub upon placing the load therein.

DISCLOSURE OF THE INVENTION

It is therefore, an object of the present invention to provide a utility cart fabricated essentially entirely out of plastic materials.

It is another object of the present invention to provide a utility cart, as above, which is capable of holding up to at least 1000 pounds.

It is yet another object of the present invention to provide a utility cart, as above, having a latch mechanism which is flush with the undercarriage thereof.

It is still another object of the present invention to provide a utility cart having a latch mechanism, as above, which more forcefully secures the cart tub to the drawbar as more weight is added thereto.

At least one or more of the foregoing objects, together with the advantages thereof over the known art relating to utility carts, which shall become apparent from the specification which follows, are accomplished by the invention as hereinafter described and claimed.

In general, a utility cart includes a plastic carriage, an elongated drawbar member for pulling the carriage, and an axle engaging one end of the drawbar member and pivotally connected to the carriage. Reinforcement ribs extend from and along the bottom of the carriage to provide strength to the carriage. A latch mechanism is connected to the drawbar member and engages the carriage to restrain the pivotal movement of the carriage with respect to the drawbar member. At least two wheels are carried by the axle.

A preferred exemplary utility cart incorporating the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 5 is a bottom plan view of the utility cart of FIG. 1.

PREFERRED EMBODIMENT FOR CARRYING OUT THE INVENTION

Figure 1:
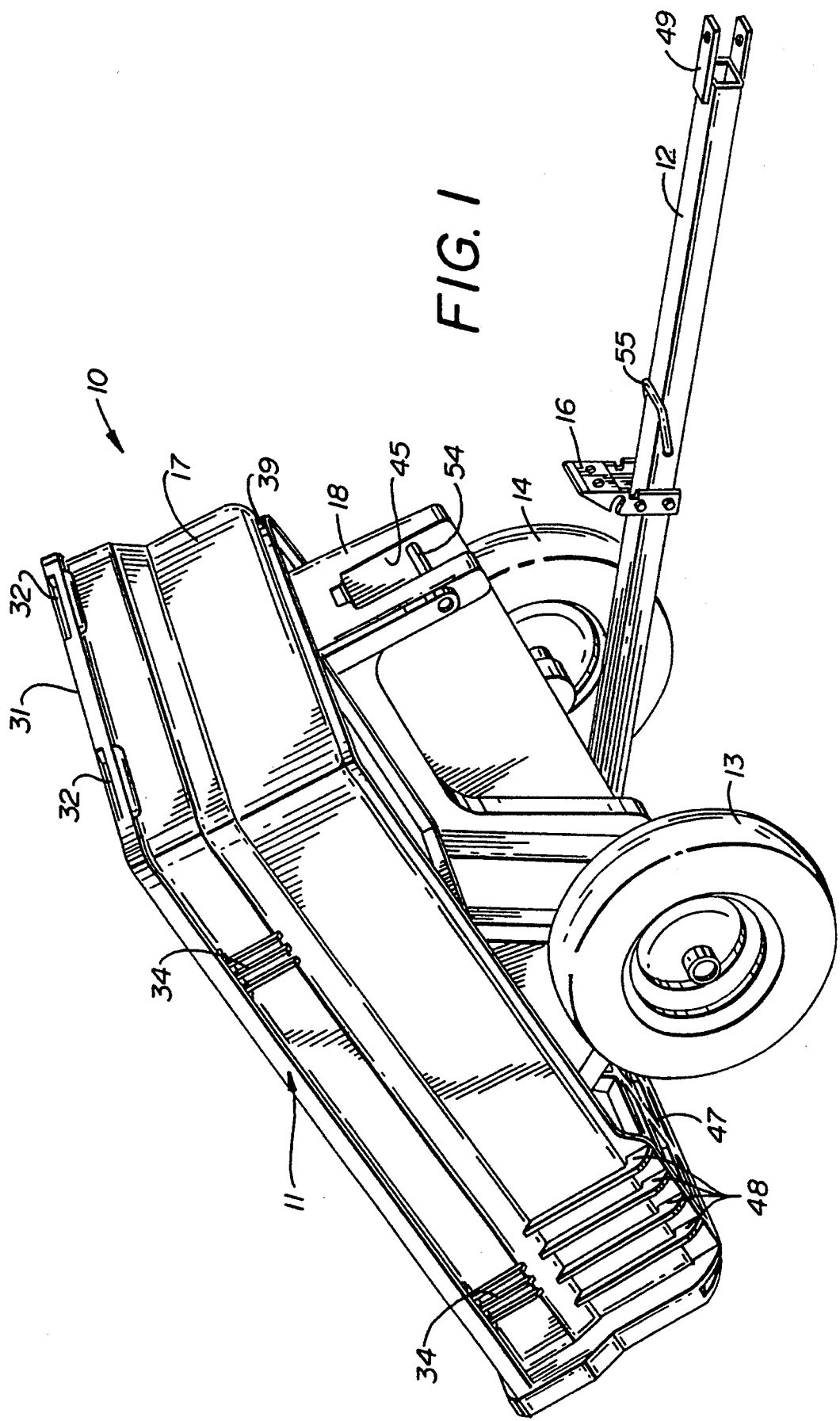
FIG. 1 is a perspective view of a utility cart according to the concepts of the present invention having the latch mechanism disengaged from the cart tub.

A utility cart made in accordance with the concepts of the present invention is indicated generally by the numeral 10 and includes a carriage 11 to haul articles, a drawbar member 12 to pull carriage 11, a pair of wheels 13, 14 connected by an axle assembly 15 which is operatively connected to carriage 11 and drawbar member 12, and a latch assembly 16 to selectively attach the front of carriage 11 to drawbar member 12. In FIG. 1, carriage 11 is shown in its tilted position with respect to drawbar member 12 so that any contents within carriage 11 may be poured or easily removed from the rear thereof. Carriage 11 is tilted by operatively disengaging latch assembly 16 from the front of carriage 11 as detailed hereinbelow.

Figure 2:
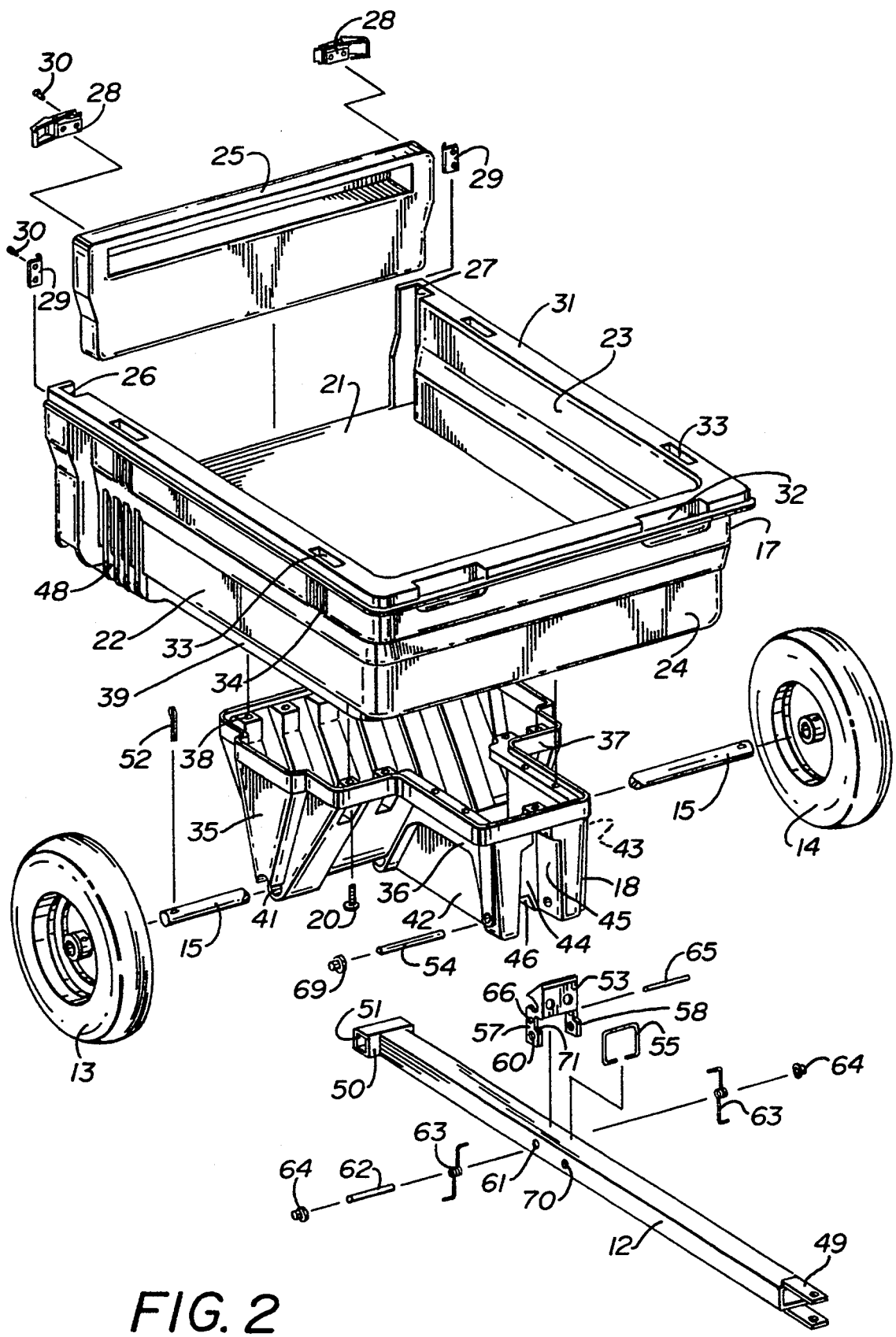
FIG. 2 is an exploded view of the utility cart of FIG. 1.

Carriage 11 includes a tub 17 and an undercarriage 18 which can be of integral construction or, as shown in FIG. 2, may be two individual parts secured together as by a plurality of bolts 20. Tub 17 is preferably made of sturdy plastic, such as polyethylene, and preferably includes a generally rectangular bottom wall or floor 21, generally rectangular sidewalls 22 and 23, and a front wall 24 joining sidewalls 22 and 23 and extending upwardly from the side edges and front edges, respectively, of bottom wall 21. A tailgate 25 may also extend upwardly from bottom wall 21 at the rear of tub 17 of utility cart 10 to complete a generally rectangular frame for tub 17.

Tailgate 25 may be slidably received by slots 26 and 27 formed in sidewalls 22 and 23, respectively, near the rear of tub 17. Thus, tailgate 25 may be selectively removed to provide access to any articles contained in tub 17 and permit the contents therein to be easily poured or removed therefrom. In addition, tailgate 25 preferably may include at least one latch 28 for releasably securing tailgate 25 to sidewalls 22 and 23. Specifically, latch keepers 29 are preferably riveted to the back ends of each sidewall 22 and 23 with rivets 30 while latches 28 are likewise preferably riveted with rivets 30 to the back of tailgate 25 at the sides thereof so that when tailgate 25 is positioned in slots 26 and 27, each latch 28 may releasably communicate with a corresponding latch keeper 29 to secure tailgate 25 to sidewalls 22 and 23.

Sidewalls 22, 23 and front wall 24 are preferably of integral construction and may include a rim 31 extending laterally outwardly around these three walls of tub 17. Handles 32 may be integrally formed within rim 31 along the top of front wall 24. While two handles are preferred, it should be understood that any number of handles may be provided in any configuration so long as they permit the user of the utility cart to more readily tilt carriage 11 when required. A plurality of stake side slots 33 may be integrally formed in rim 31 along the top of sidewalls 22 and 23 to receive wooden slats or the like (not shown) which thereby extend upwardly from rim 31 and can carry horizontal slats so as to increase the capacity of the cart. As shown in FIGS. 2 and 5, a plurality of vertical ribs 34 may extend outwardly from sidewalls 22 and 23 below slots 33 and beneath rim 31 in order to provide support for any stakes which may be placed in slots 33.

With respect to undercarriage 18, it is also preferably made of a polyethylene plastic and is generally T-shaped when viewed in its lateral plane. Undercarriage 18 includes a generally V-shaped axle receiving portion 35 and a latch receiving portion 36 extending forwardly thereof. A support rim 37 may extend around the upper edge of undercarriage 18 in order to provide rigidity thereto. Furthermore, a plurality of bolt receiving sockets 38 may be provided around undercarriage 18 and interior of support rim 37 for receiving bolts 20 to connect undercarriage 18 to tub 17 as previously described. Similar to support rim 37, an additional support rim 39 integrally a part of tub 17, encircles the periphery of bottom wall 21 of tub 17 and also provides rigidity thereto. As shown in FIG. 5, axle receiving portion 35 extends substantially across bottom 21 of tub 17 between wheels 13 and 14. It preferably includes a plurality of ridges 40 which define apertures 41 for receiving axle assembly 15 as explained hereinbelow.

Figure 3:
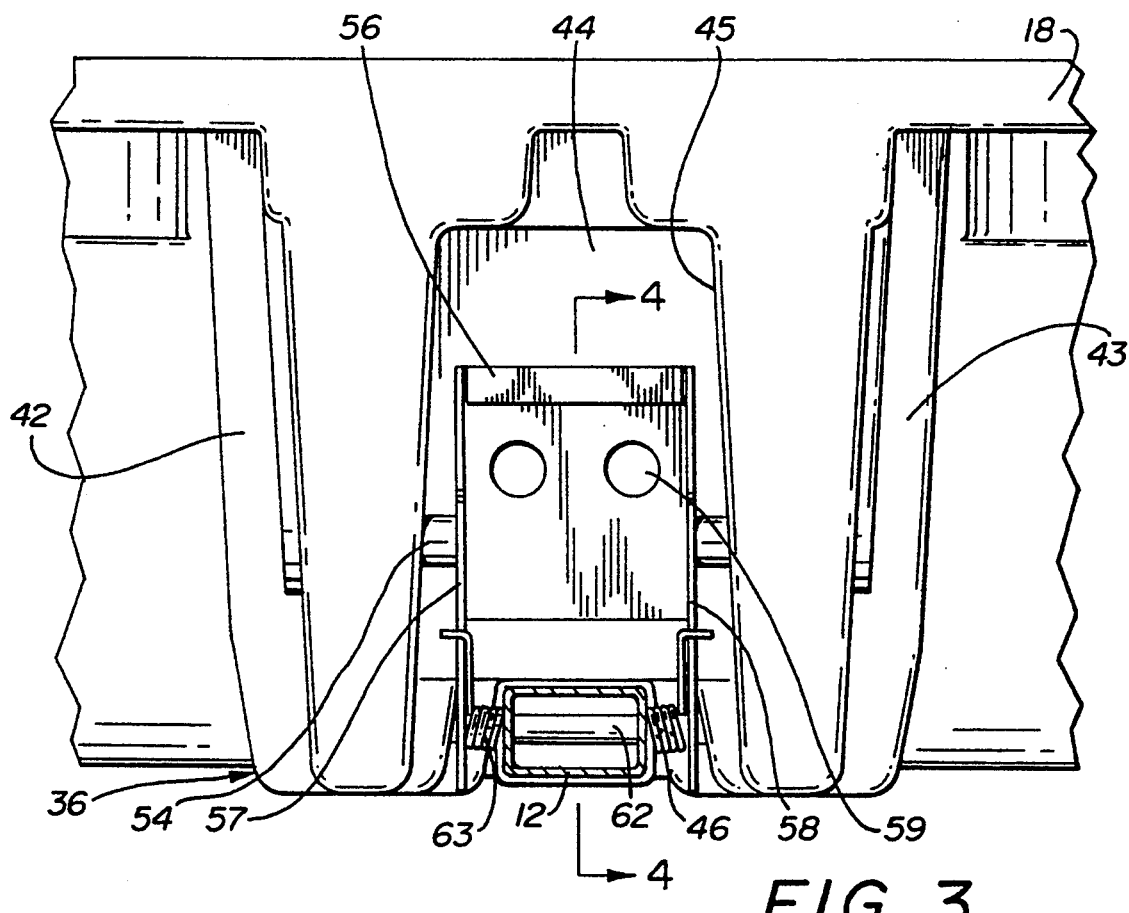
FIG. 3 is an enlarged partial front elevation of the utility cart of FIG. 1.
Figure 4:
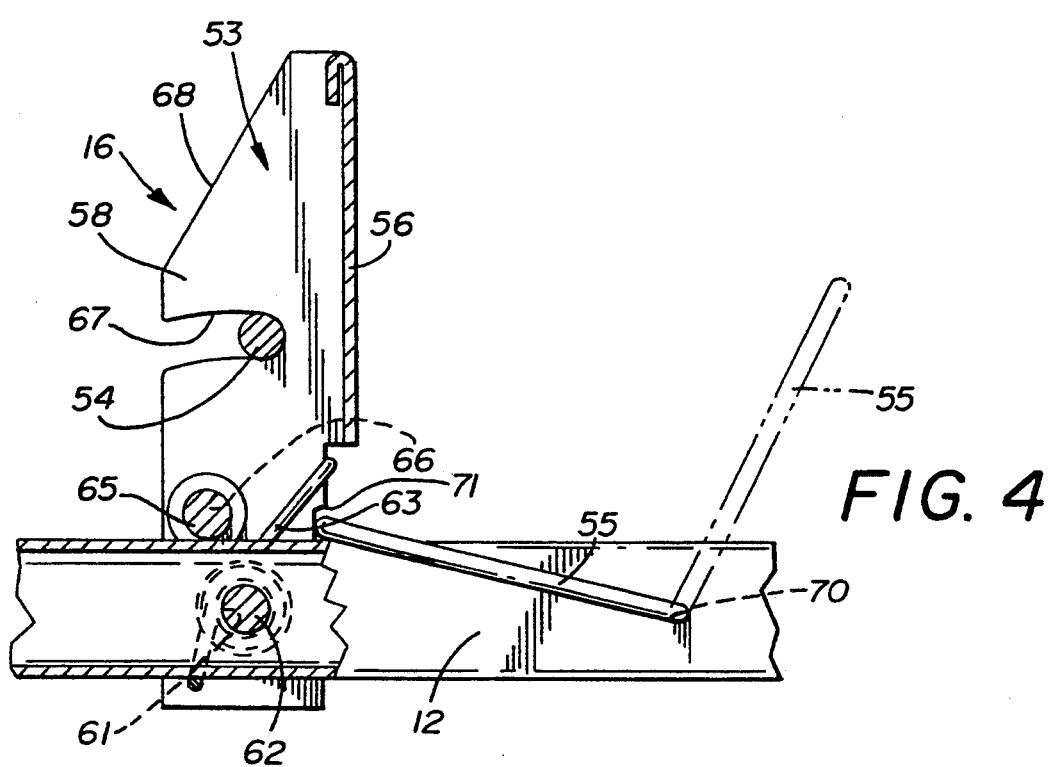
FIG. 4 is a sectional view taken substantially along line 4—4 of FIG. 3.

The latch receiving portion 36 of undercarriage 18 extends toward the front of utility cart 10 from axle receiving portion 35 and is preferably integrally constructed therewith to form undercarriage 18. As more particularly seen in FIGS. 3 and 5, latch receiving portion 36 generally includes two spaced, upstanding sidewalls 42 and 43 and a front end wall 44. A portion of front end wall 44 is indented or offset inwardly to define a recess 45. Recess 45 receives latch assembly 16 as shown in FIGS. 3 and 4 as will be further described hereinbelow. A channel 46 is provided in the bottom of latch receiving portion 36 to receive drawbar member 12 and permit it to extend to axle assembly 15.

With reference to FIG. 5, it can be seen that undercarriage 18 is connected to tub 17 between wheels 13 and 14 and is positioned generally centrally thereof. At the rear of carriage 11, and more particularly, at the rear portion of bottom 21 of tub 17, are reinforcing ribs 47 which extend downwardly and help to support the weight of any article placed in tub 17. In this embodiment, reinforcing ribs 47 generally form a grid pattern which extends from the end of undercarriage 18 to the rear of tub 17 and substantially across tub 17 to provide the necessary strength to hold up to at least 1000 pounds. Additional vertical ribs 48 extend around and at least partially up sidewalls 22 and 23 of tub 17 to provide additional support to the rear of tub 17.

Drawbar member 12 is essentially an elongated bar having a hitch 49 at one end and a connection sleeve 50 at the other. Hitch 49 may be of any conventional configuration known in the art and is shown in the drawings as a type which can receive a bolt or the like so as to attach the utility cart to a tractor or the like. As discussed hereinabove, drawbar member 12 extends beneath carriage 11, and more particularly beneath undercarriage 18, within channel 46 to axle assembly 15. The connection sleeve 50 at the other end of drawbar member 12 includes an aperture 51 (FIG. 2) through which axle assembly 15 is received.

Axle assembly 15 may connect wheels 13 and 14 together by any means known in the art. For example, as shown in FIG. 2, the hubs of wheels 13 and 14 are securedly attached to axle assembly 15 by a cotter pin 52. Axle assembly 15 operatively engages the axle receiving portion 35 of undercarriage 18 at ridges 40 on undercarriage 18. As discussed herein, ridges 40, which provide strength and stability to utility cart 10, include apertures 41 near the bottom of axle receiving portion 35 which receive axle assembly 15 therethrough such that the axle assembly is rotatably connected to undercarriage 18.

Latch assembly 16 includes an upstanding body member 53 attached to drawbar member 12 and selectively engagable with a rod 54 connected to undercarriage 18 and positioned within recess 45. A safety bail 55 may be included as part of the assembly and prevents body member 53 from being released when safety bail 55 is in the locked position as shown in FIG. 4.

More specifically, body member 53 includes a gripping portion 56 extending between a first leg portion 57 and a second leg portion 58. Gripping portion 56 preferably is wide enough to grip body member 53 with at least one finger so as to operatively release body member 53 from rod 54. In the preferred embodiment, gripping portion 56 is a generally flat sheet of metal with two rope holes 59 in it. Thus, body member 53 can be released by threading a rope through the two rope holes 59 and pulling the same or by merely manually engaging the top edge of gripping portion 56.

First and second leg portions 57 and 58 are generally symmetrical with one another and are spaced apart by and extend further downward than gripping portion 56 such that drawbar member 12 is also positioned between them. The lower end of each leg portion 57 and 58 has a bore 60 which is aligned with a similar bore 61 on drawbar member 12. A steel pin 62 is received through bores 60 and 61 to connect body member 53 to drawbar member 12. To provide body member 53 with the proper tension required to keep carriage 11 attached to drawbar member 12, at least one and preferably two torsion springs 63 may be positioned between drawbar member 12 and each leg portion 57 and 58 on pin 62. A self locking cap 64 may be provided on each end of pin 62 to prevent any of the components positioned thereon from sliding off the end of pin 62.

A second steel pin 65 may be used to prohibit torsion springs 63 from pushing body member 53 too far from its upstanding position when disengaged from carriage 11. Pin 65 is received by aligned bores 66 in first and second leg portions 57 and 58 located just above drawbar member 12 and proximate to carriage 11. That is, pin 65 must be located behind torsion spring 63 in order to prevent the movement of body member 53. Farther up first and second leg portions 57 and 58 are arcuate slots 67 which are aligned to receive rod 54. Slots 67 are arched in a manner such that as weight is added to carriage 11, rod 54 is more forcefully restrained from disengaging body member 53. The upper part of first and second leg portions 57 and 58 is sloped toward gripping portion 56 so as to provide a surface 68 which will permit an easier engagement of body member 53 to rod 54. Rod 54 is positioned within recess 45 and is attached to the opposed indented portions of front end wall 44. It is held in place by end caps 69 on each of its ends.

Safety bail 55 is a generally rectangular brace having opposed ends facing each other which may be received through bores 70 in drawbar member 12. Bail 55 is rotatable as shown in FIG. 4 so that it can be positioned against arcuate slots 71 formed in body member 53 to prevent body member 53 from disengaging rod 54.

In operation, latch assembly 16 provides a simple and easy means for engaging and disengaging carriage 11 from drawbar member 12. To engage carriage 11 to drawbar member 12, the front of carriage 11 need only be pushed down onto drawbar member 12. Rod 54 contacts the sloped upper surface 68 of first and second leg portions 57 and 58. As rod 54 slides down the slope, body member 53 pivots around pin 62 away from carriage 11 and with respect to drawbar member 12. Notably, the force exerted by carriage 11 must be greater than the force exerted by torsion springs 63 in order for body member 53 to pivot in this manner. Upon reaching slots 67, rod 54 snaps into place within slots 67. Torsion springs 63 assure that body member 53 returns to its upright position.

Once rod 54 is received within slots 67, the front end of carriage 11 is securely engaged to drawbar member 12. As can be seen in FIG. 4, body member 53 prohibits disengagement because the only way to release rod 54 from its position is by moving it back through slots 67. Inasmuch as rod 54 tends to be urged upward by the weight in carriage 11, it cannot disengage body member 53 through slots 67 until manipulated to do so. That is, carriage 11 is pivotable around axle assembly 15 and as such, tends to force the front end of carriage 11 in the upward direction. However, slots 67 are arcuate and slope downward. Thus, body member 53 restrains carriage 11 from moving. Unlike the prior art, as more weight is added to carriage 11, the force exerted by it cannot overcome the solid walls of each leg portion 57 and 58 of body member 53. Thus, body member 53 restrains the pivotal movement of carriage 11.

In addition, to prevent someone such as a child from disengaging the latch assembly 16 accidentally, safety bail 55 may be rotatably positioned in front of body member 53 such that it cannot be pulled back to release carriage 11. When body member 53 is pulled, the crossbar portion of safety bail 55 will contact body member 53 at slots 71 on first and second leg portions 57 and 58 and prohibit the pivotal movement thereof when safety bail 55 is in its locked position. Safety bail 55 can be released simply by rotating it away from body member 53 as shown in phantom in FIG. 4.

To disengage rod 54, body member 53 is manually pivoted as discussed above around pin 62. Rod 54 slides out of slots 67 and carriage 11 may be pivoted or tilted upwards. Upon releasing body member 53, it snaps back to an upright position, pin 65 contacting the upper side of drawbar member 12 to prevent body member 53 from further pivoting.

It should thus be appreciated that the utility cart of the present invention is designed to haul up to at least 1000 pounds of material within its plastic carriage 11. Reinforcing ribs 47 and undercarriage 18 provide extensive support and reinforcement for tub 17 to permit the addition of that amount of weight in utility cart 10.

It should also be understood that the latch assembly of the present invention can be used separately on other equipment and is not necessarily limited to its use on utility carts. Moreover, for utility cart 10 and latch assembly 16, the selection of specific component elements can be determined without departing from the spirit of the invention herein disclosed and described. In particular, the utility cart of the present invention is somewhat conventional to other utility carts in several respects. For example, utility cart 10 should not necessarily be limited to those types of carts having only two wheels. In addition, as noted hereinabove, other types of hitches can be substituted for the hitch described. Thus, the scope of the invention shall include all modifications and variations that may fall within the scope of the attached claims.

It should thus be appreciated that a utility cart and a latch assembly therefor constructed according to the concepts of the present invention, as described herein, accomplishes the objects of the invention and otherwise substantially improves the utility cart art.

What is claimed is:

1. A utility cart comprising a plastic tub, a plastic undercarriage connected to the bottom of said tub, said undercarriage including a plurality of walls and a recess in one of said walls, said tub having upwardly extending sidewalls and reinforcement rib means extending along the bottom thereof behind said undercarriage to strengthen said tub, an elongated drawbar member, axle means engaging one end of said drawbar member and extending through said undercarriage so that said tub and undercarriage may pivot with respect to said drawbar member, latch means connected to said drawbar member and engaging said undercarriage to restrain the pivotal movement of said tub and undercarriage with respect to said drawbar member, said latch means being positioned wholly within said recess when the utility cart is in its latched position, and at least two wheels attached to said axle means.

2. A utility cart according to claim 1 further comprising hitch means positioned at the other end of said drawbar member to attach said utility cart to means to pull said utility cart.

3. A utility cart according to claim 1 wherein said latch means includes a body member having a gripping portion extending between a first leg portion and a second leg portion, means to engage said undercarriage, and means to connect said first and second leg portions of said body member to said drawbar member and to pivot said body member with respect to the drawbar member.

4. A utility cart according to claim 3 wherein said means to engage said undercarriage includes rod means secured within a recess formed in a front wall of said undercarriage to engage said body member, and slot means positioned within said body member to receive said rod means.

5. A utility cart according to claim 4 wherein said slot means forms a downwardly curved arc and is positioned within said first and second leg portions such that as weight is added into said tub, said latch means more forcefully restrains the pivotal movement of said undercarriage and tub with respect to said drawbar member.

6. A utility cart comprising a plastic tub and undercarriage, said undercarriage having walls extending upwardly and engaging said tub, a recess in one of said walls, an elongated drawbar member, axle means received by said undercarriage and one end of said drawbar member so that said tub and undercarriage may pivot with respect to said drawbar member, latch means connected to said drawbar member and positioned wholly within said recess when engaged with said undercarriage to restrain the pivotal movement of said tub and undercarriage with respect to said drawbar member, and at least two wheels attached to said axle means.

7. A utility cart according to claim 6 wherein said tub includes a bottom, and further comprising reinforcing rib means extending downwardly therefrom to strengthen said tub.

8. A utility cart according to claim 6 wherein said latch means includes a body member having a gripping portion extending between a first leg portion and a second leg portion, means to engage said undercarriage, and means to connect said first and second leg portions of said body member to the drawbar member and to pivot said body member with respect to the drawbar member.

9. A utility cart according to claim 8 wherein said means to engage said undercarriage includes rod means secured within a recess formed in a front wall of said undercarriage to engage said body member, and slot means positioned within said body member to receive said rod means.

10. A utility cart according to claim 9 wherein said slot means forms a downwardly curved arc and is positioned within said first and second leg portions such that as weight is added into said tub, said latch means more forcefully restrains the pivotal movement of said tub and undercarriage with respect to said drawbar member.

11. A utility cart according to claim 6 further comprising hitch means positioned at the other end of said drawbar member to attach said utility cart to means to pull said utility cart.

12. A latch assembly for securing a carriage to a drawbar member comprising a body member having a gripping portion extending between a first leg portion and a second leg portion, means to engage the carriage formed in said first and second leg portions, and means to connect said first and second leg portions of said body member to the drawbar member and to pivot said body member with respect to the drawbar member, the drawbar member extending between said first and second leg portions.

13. A latch assembly according to claim 12 further comprising safety bail means attached to said drawbar member to prevent the pivotal movement of body member.

14. A latch assembly according to claim 12 wherein said means to engage includes rod means positioned within a recess formed in a wall of the carriage to engage said body member, and slot means positioned within said first and second leg portions of said body member to receive said rod means.

15. A latch assembly according to claim 12 wherein said means to connect includes a pin positioned through aligned bores in the drawbar member and said body member.

16. A latch assembly according to claim 15 further including spring means on said pin to permit the return of said body member to an upright position, and pin means positioned toward the carriage with respect to said spring means to oppose said spring means and prevent said spring means from forcing said body member from its upright position in the opposed direction.

* * * * *